United States Patent
Inoue

[15] 3,660,901
[45] May 9, 1972

[54] INSTRUMENT OF PROBING THE LENGTH OF A ROOT CANAL OF THE TOOTH

[72] Inventor: Noboru Inoue, Tokyo, Japan
[73] Assignee: Yugen Kaisha Hayashi Shika Sloten, Tokyo, Japan
[22] Filed: July 9, 1971
[21] Appl. No.: 161,059

[30] Foreign Application Priority Data

Aug. 8, 1970 Japan...................................45/69017

[52] U.S. Cl..................................................32/40, 128/2 S
[51] Int. Cl...........................................................A61c 3/00
[58] Field of Search..........................32/40; 128/2 S, 2 N, 2 R

[56] References Cited

UNITED STATES PATENTS 3,058,225 10/1962 Ward......................................128/2 S Primary Examiner—Robert Peshock
Attorney—Cullen, Settle, Sloman & Cantor

[57] ABSTRACT

An instrument for measuring the length of a root canal of the tooth provided with a transistor amplifier, at the input side thereof a probe needle for inserting into the root canal and at the output side thereof an oral mucous membrane conductor. Between the point of the probe needle and the oral mucous membrane conductor is electrically connected through a human body to form a circuit whereby the variations in low frequency oscillation due to feedback are delivered as oscillation sounds to the ear of the dentist. When the predetermined degree of oscillation sound comes to be audible, the length of the root canal is measured with an impregnated length of the probe.

1 Claim, 5 Drawing Figures

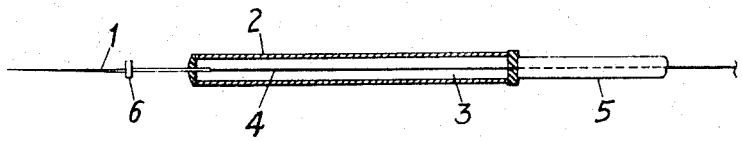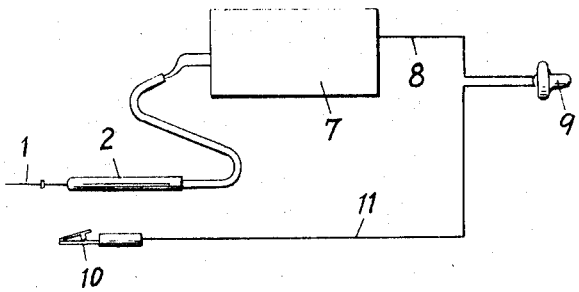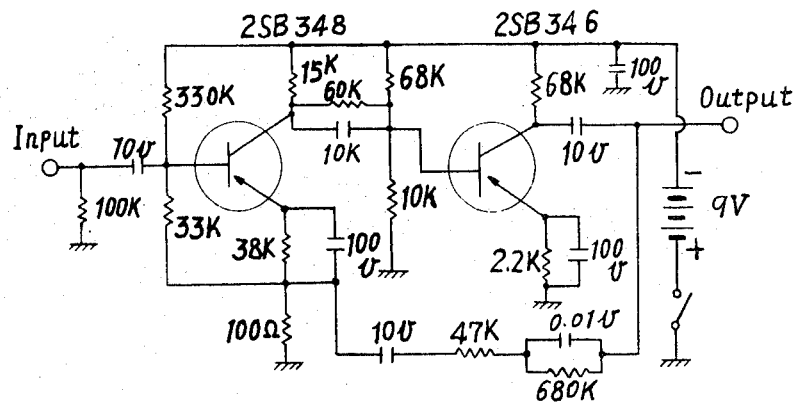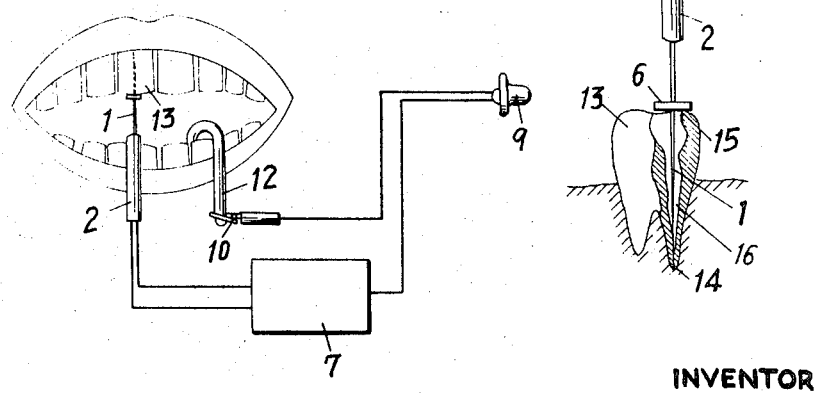

INSTRUMENT OF PROBING THE LENGTH OF A ROOT CANAL OF THE TOOTH

This invention relates to a dental instrument to be used in dental treatment for measuring the length of a root canal of the tooth of patients.

More particularly, the instrument is aimed to measure the length of a root canal of the tooth with provision of a transistor amplifier, the input side and output side thereof are electrically connected through the human body in which the variations of low frequency oscillation produced by feedback are delivered as oscillation sounds to the ear of the dentist, thus the length of the root canal of the tooth can be probed.

In the dental treatment of decayed tooth, it is often necessary for dentists to perceive the length of the root canal exactly.

So far in measuring the root canal, there have been many ways, for example, a probe is inserted into the root canal and the dentist is to perceive its length only by feeling at his fingers or the insertion of the probe is taken in an X-ray picture and the length of the root canal is calculated with a ratio between the probe-length and X-ray image. Still another is electric resistance measuring system in which electric current is passed through a probe and an amount of current at the time it reaches the root-apex of the tooth is indicated on a meter. However in the method of utilizing the X-ray picture, there is disadvantage in that it takes a considerable time for development into a picture. Also in the measurement with electric resistance, the dentist should give a look at both the tooth and the meter at the same moment, yet the measurement is not often accurate as there is individual difference in the amount of electric resistance depending on the variety of teeth and the age of patients.

One object of the present invention is to provide a dental instrument that is abled when the probe has reached the apex of the root canal to deliver an information exactly to the ear that is the most sensible organ of the human body.

The other object of the present invention is to provide a dental instrument that is abled to measure the length of a root canal with an amount of insertion of the probe into the root canal at the time when the point of the probe reaches the apex of the tooth root.

Another object of the present invention is to provide a dental instrument with which such moment that the probe reached the apex of tooth root is perceptible only by auditory sense whereby the dentist can concentrate his view only toward the tooth of the patient so that the measuring operation is effected in very safe and accurate manner.

Still another object of the present invention is to provide a dental instrument of this kind made in a compact size so that the dentist can easily carry it in a pocket of his white robe.

Yet another object of the present invention is to provide a dental instrument in which by taking the memory of the degree of oscillating sound, the water contents in the root canal or in the cavity of the tooth, and also the degree of dryness therein can be known.

The feature of the instrument for measuring the length of a root canal is as follows.

The instrument of the present invention consists of a transistor amplifier housing an electric cell, from the input side thereof extends a lead wire to a probe needle for measuring a root canal, an insulated holder for the probe needle, a rubber piece loosely fitted on said probe needle and the output side of said transistor amplifier is connected through a lead wire to a mucous membrane conductor through an ear-horn or a stethoscope.

When the probe is inserted into a tooth, a low frequency oscillation is produced. As this probe needle reaches the root apex of the tooth, oscillation comes its peak. This is sensed and amplified in the transistor amplifier producing oscillation sound to be delivered to the ear of dentist. Then the impregnated length of the probe into the tooth is measured, thus the length of the root canal is accuratedly known.

The features of the present invention will become more apparent as description proceeds with reference to the accompanying drawings in which:

FIG. 1 is a sectional view of a probe of the instrument for measuring the root canal of the present invention.

FIG. 2 is a diagrammatic illustration of the instrument including a circuit.

FIG. 3 is a wiregram of the transistor amplifier of one embodiment.

FIG. 4 is an illustration showing a way of applying the measuring instrument of the present invention to the tooth.

FIG. 5 is a view showing the probe being inserted in the root canal.

As shown in FIG. 1, a probe 1 is insulatedly supported with a cylindrical-shape hollow metal holder 2. From the fixed end of the probe 1 in the hollow portion 3 of the holder 2, a leading wire 4 extends through a shield wire 5 to the input side of a transistor amplifier 7 as seen in FIG. 2. 6 is a rubber piece provided slidably on the probe 1.

The output side of the transistor amplifier 7 is connected to one end of a leading wire 8 leading to a crystal ear-horn or a stethoscope of dentist. From this ear-horn another leading wire 11 extends through an oral mucous membrane conductor 10 to a saliva ejector hereinafter more fully described.

The transistor amplifier 7 is formed of a circuit, for example as seen in FIG. 3, the probe 1 for measuring the length of a root canal is connected to its input side to form a plus terminal. Also the oral mucous membrane conductor 10 connected through the ear-horn 9 to the output side of the transistor amplifier 7 is formed as a minus terminal. When the probe 1 and the oral mucous membrane conductor 10 are concurrently set on a human body, a feedback occurs in the transistor amplifier circuit through the human body acting as a conductor to produce a peak low frequency oscillation. That is, the transistor amplifier is functioned as a low frequency oscillator to amplify oscillating sound delivered to the ear-horn. As the position of contact of the probe to the human body forming a conductor varies, the volume of condenser C and the amount of resistance R in feedback come to vary. Therefore when the point of the probe gets out from an enclosed position in non-conductive tooth to a position in contact with conductive corporal elements of the human body, the amount of positive feedback in the transistor amplifier circuit comes to vary, as a result of which oscillation frequency too comes to vary. The instrument of this invention is so arranged that any variation, be it ever so small, in the condenser C and resistance R is arrested to be ampified and converted into oscillation sound being delivered to the ear of dentist.

In FIG. 4, a way of applying this instrument is shown. The mucous membrance conductor 10 forming one terminal is first fixed to an appliance for example as a saliva ejector 12 that is directly being contacted to a part of human body. Then the other terminal of the probe 1 is brought once into contact with the oral mucous membrance and just at this moment, an oscillation sound is produced. This sound shall be well kept in memory with ear. Then the whole area of the decayed tooth including the root canal is thoroughly dried. Then the point of the probe 1 is gradually imprignated into the root canal 16 of decayed tooth 13. Just the moment that the probe is brought into contact with the tooth, circuit is closed to produce oscillation sound. As the deeper the probe advances the higher becomes oscillation sound audible. Finally it comes to its peak as high as previously memoried by the ear. This indicates that the probe has reached the bottom apex 14 of the decayed tooth 13 (See FIG. 5). Then the rubber piece 6 is brought onto the crown 15 or the top edge of a cavity of the decayed tooth 13. After the probe 1 is pulled out, measurement is made from the position of the rubber piece to the point of the probe thus the length of the tooth is accuratedly known.

I claim:

1. An instrument for measuring the length of a root canal of the tooth comprising a transistor amplifier housing an electric cell, a probing part at the input side of the transistor amplifier consisting of a probe for measuring the length of the root canal, an insulated handle of the probe and a rubber piece slidable on the probe and at the output side of the transistor amplifier is connected through an ear-horn to an oral mucous membrane conductor, instrument characterized in that low frequency oscillation produced as the probe is inserted in the root canal is amplified in the transistor amplifier into oscillation sound and such low frequency oscillation sound becoming its peak indicates that the probe has reached the bottom apex of the root canal whereby at this moment with delivered sound to the ear-horn, the length of the root canal is measured with the penetration of the probe into the root canal.

* * * * *

UNITED STATES PATENT OFFICE
CERTIFICATE OF CORRECTION

Patent No. 3,660,901         Dated   May 9, 1972

Inventor(s)   Noboru Inoue

It is certified that error appears in the above-identified patent and that said Letters Patent are hereby corrected as shown below:

On the cover sheet [73], "Sloten,", should read -- Shoten, -- .

Signed and sealed this 8th day of May 1973.

(SEAL)
Attest:

EDWARD M.FLETCHER,JR.                ROBERT GOTTSCHALK
Attesting Officer                    Commissioner of Patents